Figure 1:
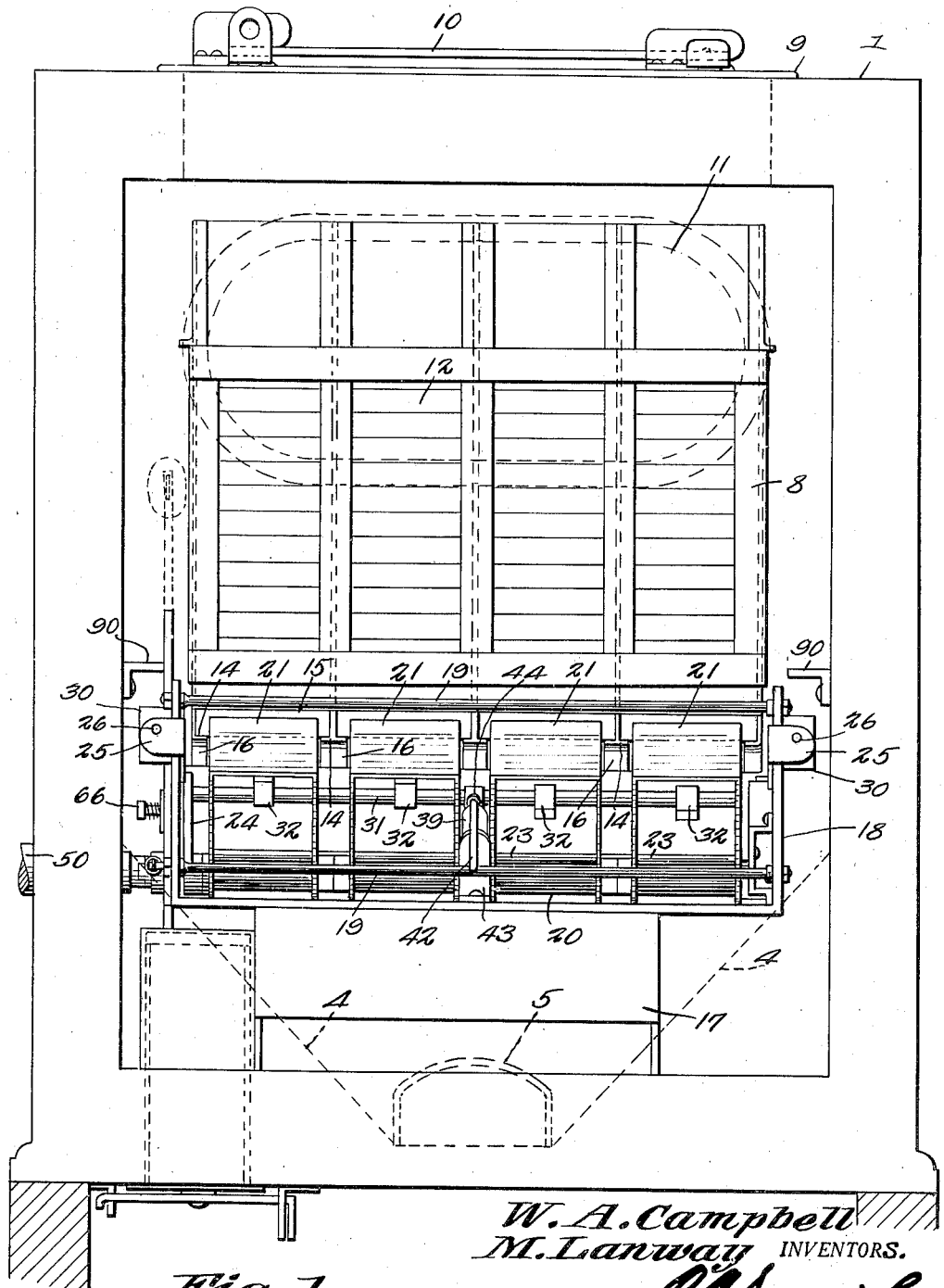

April 29, 1941.　　W. A. CAMPBELL ET AL　　2,240,389
VENDING MACHINE
Filed Aug. 26, 1940　　4 Sheets-Sheet 3

W. A. Campbell
M. Lanway INVENTORS
BY CHKnowles.
ATTORNEYS.

April 29, 1941.  W. A. CAMPBELL ET AL  2,240,389
VENDING MACHINE
Filed Aug. 26, 1940  4 Sheets-Sheet 4

W. A. Campbell
M. Lanway
INVENTORS.
BY
ATTORNEYS.

Patented Apr. 29, 1941

2,240,389

UNITED STATES PATENT OFFICE 2,240,389

VENDING MACHINE

William A. Campbell and Mearl Lanway, Traverse City, Mich., assignors to Wolverine Ice Cream Vending Machine Co., Traverse City, Mich.

Application August 26, 1940, Serial No. 354,314

7 Claims. (Cl. 312—63)

The device forming the subject matter of this application is adapted to be used for dispensing ice cream blocks or other merchandise, and one object of the invention is to improve the dispensing mechanism, another object of the invention being to improve generally, and to enhance the utility of, devices of that type to which the invention appertains.

A preferred form has been shown, but it will be understood that a mechanic, working within the scope of what is claimed, may make changes in that form, without departing from the spirit of the invention.

Figure 2:
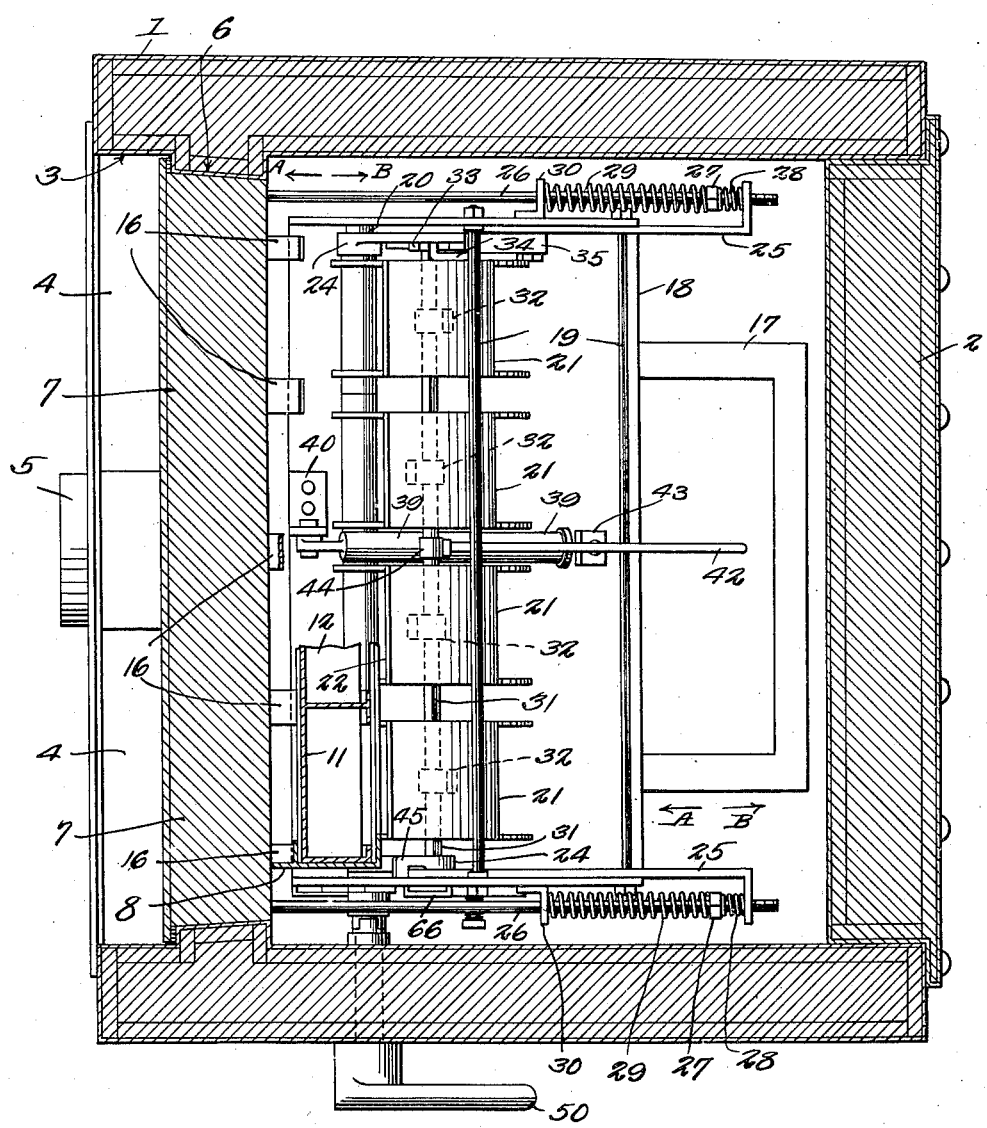
Figure 3:
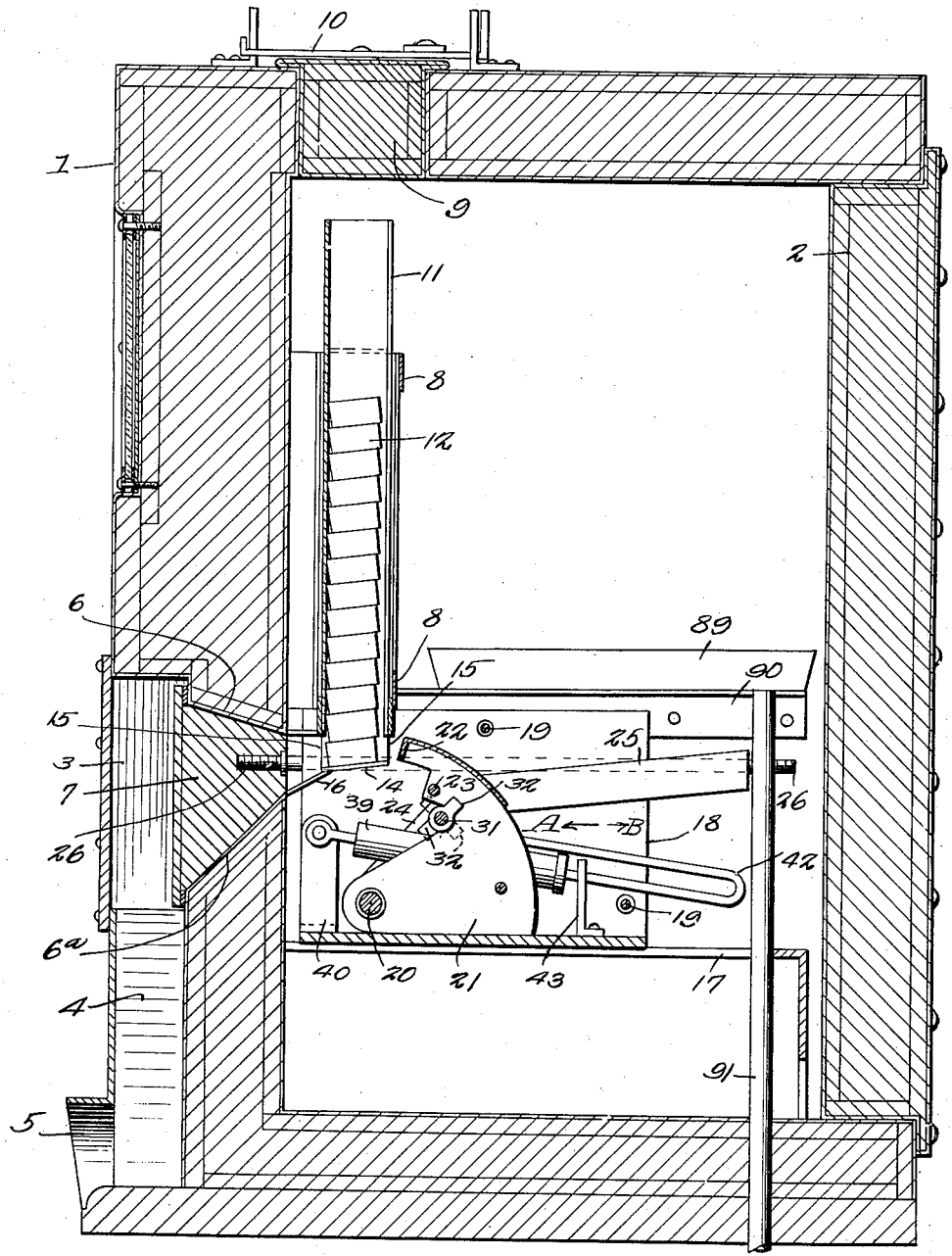
Figure 4:
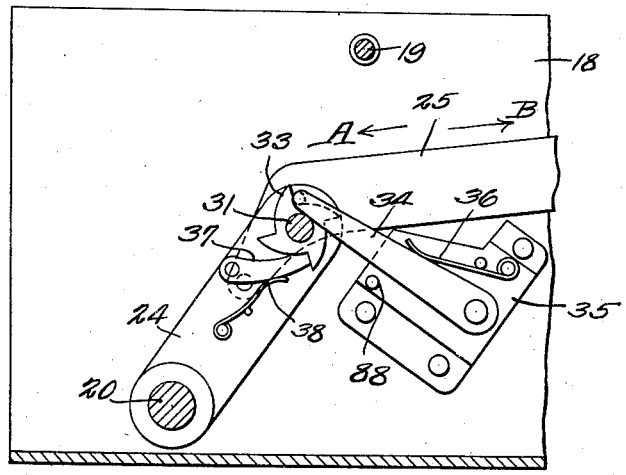
Figure 5:
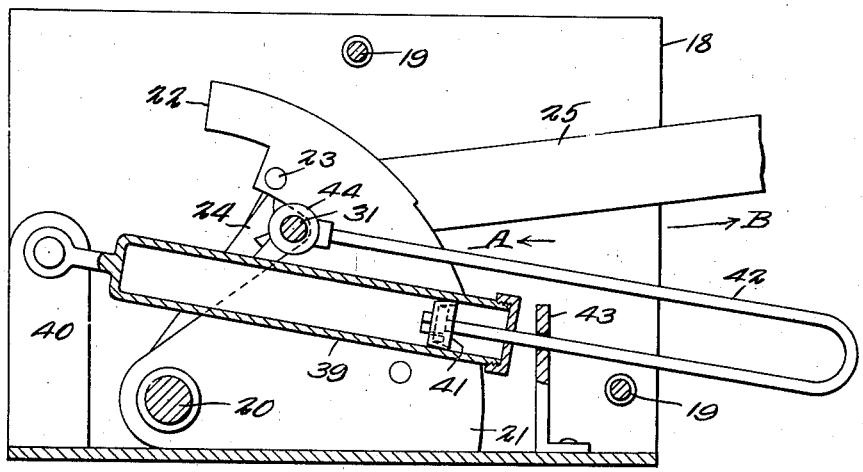

In the drawings:

Figure 1 shows the machine in rear elevation, the back of the casing having been removed; Figure 2 is a horizontal transverse section; Figure 3 is a vertical section; Figure 4 is a fragmental vertical section showing the means for rotating the shaft by which the selecting of the merchandise is accomplished; Figure 5 is a fragmental vertical section disclosing the cushion or dash pot.

The machine embodies a box-like heat-insulated casing 1, shown in Figures 1, 2 and 3. The casing 1 has a removable back 2, which has been taken out in Figure 1. It appears from Figures 2 and 3 that there is a compartment 3 in the front of the casing 1. In the compartment 3 are located downwardly converging chutes 4 (Figs. 1, 2 and 3) that lead to a hooded outlet 5 on the front of the casing 1. The inclination of the chutes 4 is shown in dotted line in Figure 1. An opening 6 (Figures 2 and 3) leads from the compartment 3 to the interior of the casing 1, and this opening converges or tapers as it extends backwardly, so that a door 7 in the opening may be moved forwardly, without difficulty. The means for moving the door 7 forwardly will be described in detail hereinafter. The downward and outward slant of the lower wall 6a of the opening 6 (Figure 3) is especially important, because it aids in the delivery of the merchandise.

A fixed rack 8 is mounted on the forward wall of the casing 1, this rack being of rectangular form, in rear elevation, as Figure 1 will show. A carrier 11 is adapted to be inserted downwardly into the rack 8, and with this end in view, the top of the casing 1 is provided with a removable closure 9, held in place by a locking mechanism 10. It can be seen, in Figure 1, that the carrier 11 is divided into a plurality of vertical compartments, in which the merchandise 12 is carried. The merchandise 12 may be blocks of ice cream, or anything else, and it is possible to load the carrier 11 with the merchandise 12, outside the machine, and then place the carrier, with the merchandise, in the rack 8, as per Figures 1 and 3.

The carrier 11 is provided at its lower end with flanges 14 (Figure 1) which stop the downward movement of the merchandise 12, and these flanges rest on brackets 16 (Figures 3 and 2) which project rearwardly from the front wall of the casing 1, to hold the carrier 11 in the rack 8, against downward movement beyond the position shown in Figures 3 and 1. The carrier 11 is provided (Figure 3) at its lower end, with front and back openings 15 for each vertical compartment, so that the ejector, represented for present purposes by the part 22 in Figure 3, can enter the carrier from the back, and shove out the lowermost pieces of merchandise 12, forwardly.

The bottom of the casing 1 carries a box-like support 17 (Figures 3 and 1), on which is mounted a U-shaped frame 18, disclosed in rear elevation in Figure 1, and in cross section in Figure 3. The upstanding ends of the frame 18 are connected, for strength and reenforcement, by transverse rods 19 (Figures 1, 2 and 3).

A horizontal shaft 20 (Figures 2, 3, 4, 5 and 8) is journaled in the upstanding ends of the frame 18. On this shaft 20, a plurality of ejectors 21 are mounted for free, vertical swinging movement, toward and away from the carrier 11 in which the merchandise is mounted, there being one ejector for each of the vertical compartments of the carrier. The outline of the ejector 21, as to side elevation, is shown in Figure 5, and the relation of the ejector to the lower end of the carrier 11 is shown in Figure 3.

Each ejector 21 has a prominently presented upper end 22, and it is by means of the end 22 that the ejection of the merchandise from the carrier 11 is accomplished immediately, as Figure 3 will show. The ejectors 21 have cross rods 23, which serve as abutments for the elements which swing the ejectors from the position of Figure 3 to operative or ejecting position. As to the means for swinging the ejectors 21, as last above referred to, Figures 1, 2, 3, 4 and 5 show that radius arms 24 are secured to the shaft 20, close to the upstanding ends of the frame 18. A shaft 31 is journaled for rotation in the upper ends of the radius arms 24, and the shaft 31 has a plurality of radial arms 32.

It can be seen in Figure 3 that the arms 32 are spaced apart, circumferentially of the shaft 31, and Figure 1 discloses the fact that the arms 32 are spaced apart lengthwise of the shaft 31, there being an arm for each of the ejectors 21, and adapted to engage the abutment 23 (Figure 3) of the ejector.

In Figure 4 there is shown a ratchet wheel 33 which is fixed on the shaft 31, near to one end of the shaft, as shown in Figure 2. When the radius arm 24 of Figure 4 swings in the direction of the arrow B, the ratchet wheel 33 coacts with a feed pawl 34 pivoted to a bracket 35 on one end of the frame 18. When the feed pawl 34 is not engaged with ratchet wheel 33, the feed pawl rests on a stop 88, carried by the bracket 35; a spring 36 on the bracket serving to swing the pawl downwardly upon the stop, and serving, also, to limit the upward swinging movement of the pawl, yieldably. A backstop pawl 37, pivoted to the radius arm 24 of Figure 4, cooperates with the ratchet wheel 33 and is governed by a spring 38 on the said radius arm.

Having thus described the means whereby the shaft 31 is turned, to present the arms 32 (Figure 3), one after another, to the abutments 23 on the ejectors 21, the means for moving the door 7 outwardly, to permit the merchandise to escape, will now be explained.

Links 25, to be seen in Figures 3, 2, 4 and 5, are pivoted to the radius arms 24, and extend backwardly. The forward ends of connecting rods 26 are mounted in the door 7 (Figure 3) near to its ends (Figure 2) and slide in brackets 30 (Figure 2) on the upstanding ends of the frame 18. The rear ends of the rods 26 slide in the rear ends of the links 25. Adjusting nuts 27 are threaded on the rods 26, cushioning compression springs 28 being interposed between the nuts 27 and the rear ends of the links 25, and strong compression springs 29 being interposed between the nuts 27 and the brackets 30 (Figure 2). When the links 25 move in the direction of the arrow A (Figure 2), they comprise the springs 29, slide the rods 26, and open the door 7. When the links 25 move in the direction of the arrow B, the springs 29 react, and close the door 7.

The springs 29 function, also, to swing the radius arms 24, in the direction of the arrow B, to the position of Figure 4, and in order to cushion the movement in that direction, there is provided a dash pot mechanism displayed in Figure 5, and comprising a cylinder 39 pivoted to a bracket 40 on the bottom of the frame 18. In the cylinder 39 slides the usual valved dash pot piston 41, connected to a U-shaped piston rod 42, the lower arm of which slides in a guide 43 on the bottom of the frame 18. The upper arm of the piston rod 42 is pivoted at 44 to the shaft 31 that is carried by the radius arms 24 on the shaft 30. The position of the dash pot mechanism 30—42 in the machine can be seen in Figure 2.

Referring to Figure 2, the reader will note that the radius arm 24 which is at the left hand side of the machine in Figure 1, carries a lateral finger 45 adapted to move in the direction of the arrows A and B. So far as the operation of the dispensing mechanism is concerned, it may be assumed that the finger 45 is moved, by any suitable means, backward and forward in Figure 2, in the direction of the arrows A and B of that figure. Some prefer to operate the finger 45 through the instrumentality of a coin-controlled mechanism, indicated generally by the numeral 66, but undisclosed as to details, herein, because an application for patent on a vending machine should embody no claims to a coin-controlled mechanism. Considered as a vending machine, the crank shown at 50 may be regarded as a means for operating the finger 45.

In practical operation, when the finger 45 of Figure 2 is moved in the direction of the arrow A, the radius arm 24 to which the finger 45 is connected, moves in the direction of the arrow A, and the shaft 20 is rotated, the radius arm 24 of Figure 4 being swung in the same direction, by the shaft 20. As the radius arms 24 are swung in the direction of the arrow A, the links 25 are carried in the direction of the arrow A, because they are pivoted to the radius arms. The rods 26 and the door 7 also are carried in the direction of the arrow A, and the door is moved to open position in Figure 3.

When the rods 26 move in the direction of the arrow A, the springs 29 of Figure 6 are compressed, and the dash pot piston 41 of Figure 5 moves in the direction of the arrow A, because the U-shaped piston rod 42 is pivoted at 44 to the shaft 31 that is carried by the radius arms 24. The shaft 31 is moved transversely by the radius arms 24, and one of the arms 32 (Figure 3) on the shaft 31 engages the abutment 23 on the corresponding one of the ejectors 21. Here note that the shaft 31 cannot turn because the backstop pawl 37 of Figure 4 is engaged with the ratchet wheel 33 on the shaft 31, and since the shaft 31 cannot turn, the arm 32 of Figure 5 engages the abutment 23 on one of the ejectors 21, and swings that ejector in the direction of the arrow A, the end 32 of the ejector entering the rear opening 15 of the carrier 11 and shoving the lowermost piece of merchandise 12 out through the front opening 15. It being recalled that door 7 is in open position at this time, the ejected piece of merchandise moves forwardly along the inclined bottom of the opening 6, into the front compartment 3, and thence the piece of merchandise slides along one of the inclined chutes 4 of Figures 3 and 1, to the outlet 5.

Suppose, now, that the finger 45 on the radius arm 24 of Figure 2 is released, so that it can move in the direction of the arrow B. When the finger 45 thus is released, the springs 29 of Figure 2 (then under compression) react and carry the rods 26 in the direction of the arrow B, the door 7 being closed, as in Figures 2 and 3. The rods 26 carry the links 25 in the direction of the arrow B, and the radius arms 24 and the shaft 31 are carried in that direction also. One tooth of the ratchet wheel 33 on the shaft 21 (Figure 4) is engaged by the feed pawl 34, and the shaft 31 is rotated one step, thus bringing another arm 32 (Figure 3) on the shaft into position to engage with the abutment 23 on the corresponding ejector 21, when the next movement in the direction of the arrow A takes place.

The arms 32 are spaced circumferentially around the shaft 31, and the arms, one after another, come into play, to swing the corresponding ejector 21 in the direction of the arrow A, the lowermost pieces of merchandise 12 in the vertical rows of Figure 1 being dispensed, one at a time. The dash pot mechanism 39—42 of Figure 5 cushions the movement of the parts, as they move in the direction of the arrow B, responsive to the action of the springs 29.

If the merchandise at 12 is of such a nature as to require cooling, any suitable refrigerating mechanism, forming no part of the present invention, may be provided. As a disclosure of one simple refrigerating means, the drawings show an ice pan 89 supported on brackets 90 carried by the casing 1, a drip pipe 91 leading downward from the ice pan through the bottom of the casing, as in Figure 3.

What is claimed is:

1. A dispensing machine comprising a plurality of merchandise holders, an ejector for each holder, means for mounting the ejectors for swinging movement toward and away from the holders, mechanism for swinging the ejectors, one at a time, said mechanism comprising a first shaft having arms arranged in staggered relation, means for mounting the first shaft for rotation, and for transverse movement in an arc thereby to cause one arm to move one ejector to ejecting position with respect to one of the holders, means for rotating the first shaft to select one arm and to bring it into operative relation to the corresponding ejector, the means for mounting the ejectors for swinging movement being a second shaft on which the ejectors swing, the means for mounting the first shaft for rotation and for transverse movement in an arc being carried by the second shaft; means for mounting the second shaft for rotation, and means for rotating the second shaft.

2. A dispensing machine comprising a plurality of merchandise holders, an ejector for each holder, means for mounting the ejectors for swinging movement toward and away from the holders, mechanism for swinging the ejectors, one at a time, said mechanism comprising a first shaft having arms arranged in staggered relation, means for mounting the first shaft for rotation, and for transverse movement thereby to cause one arm to move one ejector to ejecting position with respect to one of the holders, means for rotating the first shaft to select one arm and to bring it into operative relation to the corresponding ejector, the means for mounting the ejectors for swinging movement being a second shaft on which the ejectors swing, the means for mounting the first shaft for rotation and for transverse movement being radius arms on the second shaft, wherein the first shaft is journaled; means for mounting the second shaft for rotation, and means for rotating the second shaft.

3. A dispensing machine comprising a plurality of merchandise holders, an ejector for each holder, means for mounting the ejectors for swinging movement toward and away from the holders, mechanism for swinging the ejectors, one at a time, said mechanism comprising a first shaft having arms arranged in staggered relation, means for mounting the first shaft for rotation, and for transverse movement in an arc thereby to cause one arm to move one ejector to ejecting position with respect to one of the holders, means for rotating the first shaft to select one arm and to bring it into operative relation to the corresponding ejector, the means for rotating the first shaft to select one arm comprising a ratchet wheel on the first shaft, a feed pawl with which the ratchet wheel engages as the ejectors move away from the holders, and means for mounting the feed pawl.

4. A dispensing machine comprising a plurality of merchandise holders, an ejector for each holder, means for mounting the ejectors for swinging movement toward and away from the holders, mechanism for swinging the ejectors, one at a time, said mechanism comprising a first shaft having arms arranged in staggered relation, means for mounting the first shaft for rotation, and for transverse movement thereby to cause one arm to move one ejector to ejecting position with respect to one of the holders, means for rotating the first shaft to select one arm and to bring it into operative relation to the corresponding ejector, the means for mounting the ejectors for swinging movement being a second shaft on which the ejectors swing, the means for mounting the first shaft for rotation and for transverse movement being radius arms on the second shaft, wherein the first shaft is journaled, the means for rotating the first shaft to select one arm comprising a ratchet wheel on the first shaft, a feed pawl with which the ratchet wheel engages as the ejectors move away from the holders, and means for mounting the feed pawl; and a back stop pawl mounted on one of the radius arms and engaging the ratchet wheel.

5. A dispensing machine comprising a casing, a plurality of merchandise holders in the casing, an ejector for each holder, a shaft on which the ejectors swing toward and away from the holders, means for rotating the shaft, radius arms on the shaft, another shaft journaled in the radius arms and having arms arranged in staggered relation, means for rotating the said other shaft to select one arm thereon and bring it into operative relation to the corresponding ejector, a door carried by the casing, the ejectors constituting means for moving the merchandise through the door aperture when the opening of the door permits, and means operated by one of the radius arms for opening and closing the door.

6. A dispensing machine comprising a casing, a plurality of merchandise holders in the casing, an ejector for each holder, a shaft on which the ejectors swing toward and away from the holders, means for rotating the shaft, radius arms on the shaft, another shaft journaled in the radius arms and having arms arranged in staggered relation, means for rotating the said other shaft to select one arm thereon and bring it into operative relation to the corresponding ejector, a door carried by the casing, the ejectors constituting means for moving the merchandise from the holders and through the door aperture when the opening of the door permits, means operated by one of the radius arms for opening and closing the door, the last-specified means embodying a link pivoted to one radius arm, a connection united to the door, a fixed abutment, an abutment on the connection, a spring interposed between the abutments, and means whereby the link will slide the connection in one direction, open the door, and compress the spring, the spring reacting to slide the connection in an opposite direction, close the door, and retract the link.

7. A dispensing machine comprising a casing, a plurality of merchandise holders in the casing, an ejector for each holder, the ejectors being mounted for swinging movement, a shaft supported for rotation, means for rotating the shaft, radius arms on the shaft, another shaft journaled in the radius arms and having arms arranged in staggered relation, means for rotating said other shaft to select one arm thereon and bring it into operative relation to the corresponding ejector, a door carried by the casing, the ejectors constituting means for moving the merchandise from the holders and through the door aperture when the opening of the door permits, a link pivoted to one radius arm, a connection united to the door, a fixed abutment, an abutment on the connection, a spring interposed between the abutments, means whereby the link will slide the connection in one direction, open the door, and compress the spring, the spring reacting to slide the connection in an opposite direction, close the door, and retract the link, and means for cushioning the door during its closing movement, and the link during its retraction.

WILLIAM A. CAMPBELL.
MEARL LANWAY.